UNITED STATES PATENT OFFICE.

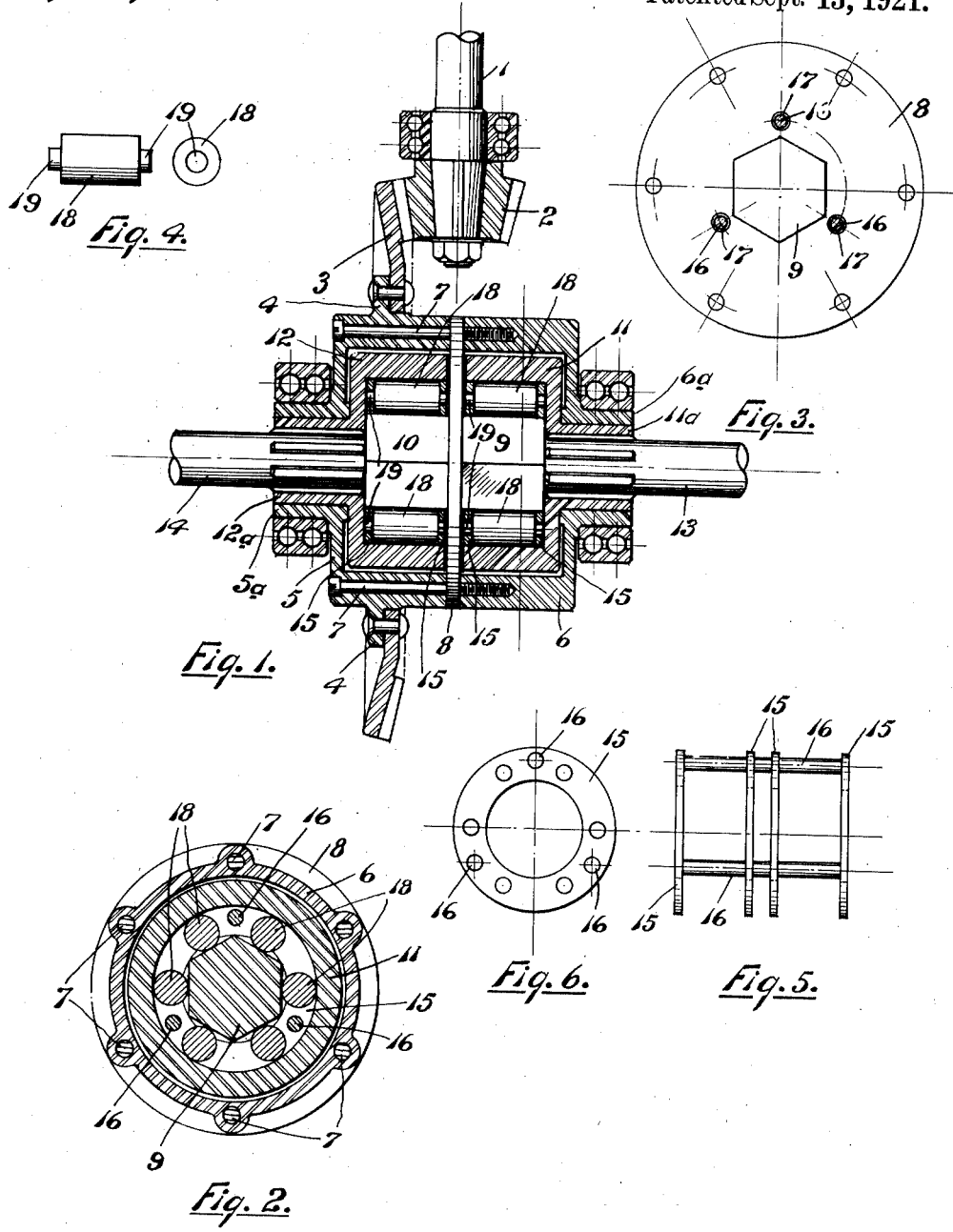

BAYARD E. RICHARDSON, OF GRAND RAPIDS, MICHIGAN, ASSIGNOR TO MECHANO GEAR SHIFT COMPANY, OF GRAND RAPIDS, MICHIGAN, A CORPORATION OF MICHIGAN.

DIFFERENTIAL GEARING.

1,390,641.   Specification of Letters Patent.   Patented Sept. 13, 1921.

Application filed August 9, 1919. Serial No. 316,350.

*To all whom it may concern:*

Be it known that I, BAYARD E. RICHARDSON, a citizen of the United States of America, residing at Grand Rapids, in the county of Kent and State of Michigan, have invented certain new and useful Improvements in Differential Gearing; and I do hereby declare the following to be a full, clear, and exact description of the invention, such as will enable others skilled in the art to which it appertains to make and use the same.

This invention relates to a differential gearing particularly applicable to motor vehicles. It is an object and purpose of the invention to construct a differential gearing which shall be simple, compact and workmanlike in construction and which will serve to permit one wheel of the vehicle at the rear end to turn faster than the other when a change of direction in the movement of the vehicle is made as in other differential gearing constructions. A further object of the invention is to so construct the differential gearing that the driving force of the drive shaft of the vehicle shall be transmitted to the wheel which moves slowest in making a turn from a straight ahead direction of travel, the other faster moving wheel turning freely on the road or pavement by reason of rolling contact therewith. This is of value in many respects, particularly in preventing spinning of one wheel under the influence of driving force from the drive shaft of the vehicle while the other remains at rest as many times occurs when one wheel has a firm bearing on the road and the other has not, the latter spinning rapidly with ordinary types of differential construction with a resultant impossibility of moving the vehicle under its own power. With my invention, the wheel having the firm bearing will be acted upon, thus causing the vehicle to move so long as one of the rear wheels has proper driving surface with which to engage. A still further object of the invention is to construct a differential gearing containing many novel features of construction and arrangements of parts, with the complete elimination of interior gears, or springs of whatever character making the construction one of marked simplicity yet very effective and durable.

The construction which attains these ends as well as many others not at this point specifically described is shown in the accompanying drawing, in which, Figure 1 is a horizontal section through the differential gearing construction, fragmentary portions of the rear end of the drive shaft and of the rear axle shafts being shown in plan.

Fig. 2 is a transverse vertical section through the differential gearing taken at one side of the middle thereof.

Fig. 3 is an end elevation of the inner clutch member of the differential gearing.

Fig. 4 is a side and end elevation of one of the rollers, a plurality of which are used in the construction.

Fig. 5 is an elevation of the cage which carries two complete sets of the rollers shown in Fig. 4, and Fig. 6 is an end view thereof.

Like reference characters refer to like parts in the several views of the drawing.

The rear end of the drive shaft 1 of the motor vehicle with which my invention is used is equipped with a beveled pinion 2 which meshes with and drives a beveled gear 3, formed substantially ring-shaped and attached to an annular flange 4 formed integral with and projecting from one member 5 of an inclosing casing for the clutch member parts of the differential. This casing is completed by a second member 6 substantially the same as member 5 except for the flange 4 noted. Both members 5 and 6 are substantially cup-like in shape and are connected together by a series of screws 7 to form a hollow casing as shown. The two casing members 5 and 6 are separated by a circular plate 8 from opposite sides of which blocks 9 and 10 project, the same being hexagonal in cross section. The screws 7 pass through the plate so that it is apparent that said housing members 5 and 6, plate 8 and the blocks 9 are all driven together when the drive shaft 1 is turning. The blocks 9 and 10 having sides of a hexagon make inner members of clutches as will later appear. While the six sides to the blocks 9 and 10 are used, the invention is not limited to any particular number of sides to the blocks.

The plate divides the casing into two parts and in each an outer clutch member is located. One of these members 11 is housed in the outer casing member 6, while the other indicated at 12 is similarly located within the casing member 5. The two clutch members 11 and 12 have outwardly projecting sleeves 11ª and 12ª into which the inner ends of the two shaft parts 13 and 14 of the rear axle extend, being keyed thereto in any suitable manner as shown. The outer clutch members 11 and 12 are also substantially cup-shaped and pass over the inner clutch members 9 and 10, respectively, being spaced a distance therefrom at the sides. The ends of the parts 9 and 10 extend the full depth of the outer clutch members 11 and 12, practically abutting against the ends of the shafts 13 and 14 as shown. The casing members 5 and 6 are provided with projecting sleeves 5ª and 6ª in which the sleeves 12ª and 11ª, respectively are rotatably mounted, it being evident that either outer clutch member with its attached shaft 13 or 14 may turn with respect to the inner clutch members 9 or 10 and the casing with which said inner members must move.

Against the end of and within each of the outer clutch members 11 and 12 a ring 15 is located and, similarly, a ring 15 is placed against each side of the plate 8, being located around the two blocks 9 and 10. Rods 16, three in number in the construction shown connect all of the rings together, said rods passing through openings 17 in the plate 8, which openings are of greater diameter than the diameters of the rods, as shown in Fig. 3. The rings 15 are of flat metal and with the rods 16 make a cage for the mounting of a plurality of rollers 18. One of these rollers is located at each of the hexagonal sides of the inner clutch member blocks 9 and 10 and is mounted between the rings 15 at the sides of the plate 8, there being two complete sets of rollers, six in each set as indicated. Each roller at each end is formed at each end with a round projection 19 which enters an opening in a ring 15 larger in diameter than the diameter of said projection. The rollers are of such diameter that the same fit rather closely between the sides of the members 9 and 10 and the curved inner sides of the members 11 and 12 so that the rollers cannot pass a corner where two of the sides of said members 9 and 10 meet but allow the free movement of the outer members 11 and 12 when the rollers are at middle position between the said corners.

In operation, with the rear wheels of a vehicle attached at the outer ends of the shafts 13 and 14, as understood by all familiar with motor vehicle construction, the rotation of the drive shaft 1 has the effect of moving the vehicle forward or to the rear depending on which way the drive shaft is turned. The gear 3, casing to which it is attached, ring 8 and inner clutch members 9 and 10 are rotated and the first effect of such rotation is to wedge the various rollers 18 between the sides of the inner clutch members 9 and 10 and the outer clutch members 11 and 12. This results by reason of the play allowed of the rods 16 in the openings 17 in plate 8 whereby the roller holding cage as a whole moves slightly or until stopped by engagement of the rods 16 against the plate 8, this bringing the rollers 18 away from central position with respect to the sides of the inner members 9 and 10 with a consequent wedging and connection of the clutch members which serves to drive the shafts 14 and 15.

As long as the travel of the vehicle is straight ahead, there will be no change in the parts of the two clutch members included in the differential gearing construction. When a change in direction is made, the wheel on the inner side of the turn will be driven directly by the drive shaft while the outer clutch member, either 11 or 12, which is connected with the wheel making the longer outer travel of the turn, will turn faster than the inner clutch members are driven and run over the rollers 18 associated with it, the driving of such wheel on the outer longer travel of the turn being made by rolling contact thereof with the road. The vehicle itself is driven forward by the wheel on the shorter length of the turn. As soon as the wheel on the outer radius of the turn begins to go faster than the one on the inner radius, the clutch member, 11 or 12, which may be associated therewith tends to carry the rollers 18 associated therewith away from the wedging position and back to central position. The movement allowed to such rollers from the enlargement of the openings in rings 15 over the projections 19 of the rollers permits them to move until mid-position with respect to the sides of the inner clutch member 9 or 10 is reached but no farther, whereupon the outer clutch member may freely turn without reference to its inner clutch member. This action takes place irrespective of whether the turn is to the right or the left, or whether the vehicle is moving forward or to the rear.

The construction described is very simple in construction, and easily and economically manufactured and assembled. The clutch construction within the differential gearing is compact, efficient and durable. No springs of any kind are present in the construction. One feature of particular merit in this construction is the positive connection which is always present between the driving power and a wheel which has tractive connection with the road, irrespective of what the condition of the opposite wheel may be. This is an insurance against skidding or inability to move the vehicle should one of the wheels at the rear get into soft earth, mud or the like so that it cannot get a grip on the road. In this case, if the other wheel has firm road connection it will carry the vehicle out where, with most common and well known types of differential gearing, the wheel having the least resistance to overcome, spins aimlessly when the power is connected with the rear axle through the differential.

I claim:

1. In combination, a drive shaft, a hollow casing, gearing connections between the shaft and casing, a plate located across the casing and substantially dividing the same into two compartments, a clutch member projecting from each side of the plate and formed with a plurality of sides disposed at an angle to each other, a second clutch member placed over each of said first named clutch members and located within the casing, said second clutch members having cylindrical inner surfaces and being provided with means for rotatably mounting them in opposite ends of the casing, a shaft attached to each of the second clutch members, spaced apart rings in each of the second clutch members and located around the first clutch members, rods connecting all of the rings together, said rods passing through openings in said plate larger than the diameter of the rods, and rollers rotatably mounted on and between the rings in each compartment of the casing, one roller being located at each side of each of the first clutch members and provided with projections at its ends for entering openings of larger size than the cross section of the projections made in said rings, substantially as described.

2. In combination, a drive shaft, a hollow casing formed of two cup-like members, a circular plate disposed between the two members of the casing, means for permanently connecting the casing members and plate together, an inner clutch member attached to and projecting from each side of the plate within the casing, each of said members having a plurality of sides disposed at equal angles to each other, an outer clutch member of substantially cup-like form located in each end of the casing and having rotatable mounting on the adjacent casing member, a shaft attached to each outer clutch member, said shafts extending in opposite directions away from each other, a pair of rings within each outer clutch member and around each inner clutch member, rods connecting all of the rings together, said rods passing through openings in the plate larger than the cross section of the rods, and rollers disposed between each inner and outer clutch member, one roller being located at each side of the inner clutch member and formed at its ends with projections of reduced size which are received in openings of larger size in said rings, substantially as described.

In testimony whereof I affix my signature.

BAYARD E. RICHARDSON.